United States Patent [19]
Yamanaka et al.

[11] Patent Number: 5,629,072
[45] Date of Patent: May 13, 1997

[54] PRESSURE-SENSITIVE TRANSFER DELIVERY STICKER SLIP

[75] Inventors: Masaaki Yamanaka; Akira Iwai, both of Ibaraki, Japan

[73] Assignee: Oji-Yuka Synthetic Paper Co., Ltd., Tokyo, Japan

[21] Appl. No.: 634,726

[22] Filed: Apr. 19, 1996

[30] Foreign Application Priority Data

May 23, 1995 [JP] Japan .................... 7-146919

[51] Int. Cl.$^6$ ...................................... B32B 3/00
[52] U.S. Cl. .................. 428/195; 428/211; 428/220; 428/317.9; 428/910; 462/18; 462/901
[58] Field of Search .................... 428/220, 910, 428/195, 211, 317.9; 462/18, 901

[56] References Cited

U.S. PATENT DOCUMENTS 4,667,984  5/1987  Nitta .

*Primary Examiner*—Alexander Thomas
*Attorney, Agent, or Firm*—Oblon, Spivak, McClelland, Maier & Neustadt, P.C.

[57] ABSTRACT

A pressure-sensitive transfer delivery sticker slip is described, which comprises (1) a monoaxially-stretched multi-layer film having an opacity of not less than 80% (as determined according to JIS P-8138) and a tensile modulus of not less than $2 \times 10^4$ kgf/cm$^2$ in the stretching direction (JIS K-7127) obtained by monoaxially stretching a laminated film having a surface layer (B) comprising a resin composition comprising from 60 to 80% by weight of a finely divided inorganic powder ($B_2$) incorporated in from 20 to 40% by weight of a crystalline polyolefin ($B_1$) laminated on at least one side of a core layer (A) comprising as a base a resin composition comprising from 1 to 30% by weight of a finely divided inorganic powder ($A_2$) incorporated in from 70 to 99% by weight of a crystalline polyolefin ($A_1$) at a temperature of not higher than the melting point of said crystalline polyolefins ($A_1$, $B_1$) by a stretch ratio of from 3 to 10 in such a manner that fine isolated voids are formed in the various layers, (2) printing information on the surface of said surface layer (B) and (3) providing a carbon or non-carbon pressure-sensitive layer on the back layer of said monoaxially-stretched multi-layer film.

10 Claims, 2 Drawing Sheets

PRESSURE-SENSITIVE TRANSFER DELIVERY STICKER SLIP

FIELD OF THE INVENTION

The present invention relates to a monoaxially-stretched laminated film-based pressure-sensitive transfer delivery sticker slip having excellent writability, carbon ink transferring properties and water resistance and a high elastic modulus.

BACKGROUND OF THE INVENTION

In post offices and private transport companies, a delivery slip has heretofore been employed which comprises a cover made of a synthetic paper consisting of a surface layer having the columns of destination, sender, item to be delivered, etc. printed on the surface made of a finely divided inorganic powder-incorporated monoaxially-stretched thermoplastic resin film, a biaxially-stretched film base layer laminated on the surface layer and a back layer having a carbon or non-carbon pressure-sensitive layer form-printed on the surface laminated on said base layer, said cover being provided with duplicates for customer, transport company, agent, etc. attached thereunder. The cover is attached to goods to be shipped to their destination (JP-A-U-60-162067 (The term "JP-A-U" as used herein means an "unexamined published Japanese utility model application"), JP-A-U-59-164763, JP-A-U-60-137572, JP-B-U-7-17507 (The term "JP-B-U" as used herein means an "examined Japanese utility model publication").

An example of such a delivery slip is a pressure-sensitive transfer sticker slip (1) as shown in FIGS. 1, 2 and 3. The pressure-sensitive transfer sticker slip (1) comprises a belt-shaped main body (9) made of a synthetic paper having a predetermined print (13) consisting of a series of unit printed area made on the surface thereof and a non-adhesive area (12A) on a feed perforation portion (15) along both sides, an adhesive area (12B) on the other area and a carbon pressure-sensitive layer (14) on a predetermined area on the back layer surface thereof. The belt-shaped main body (9) comprises a belt-shaped release paper (10) attached to the back surface thereof to form a sticking continuous belt (2). The sticking continuous belt (2) is laminated with a continuity of duplicate slips (3), (4), (5), (6), (7) and (8) (e.g., client's duplicate, agent's duplicate, delivery certificate, transport company's duplicate) made of pulp paper. The laminate is perforated on both sides thereof to have a series of feed perforations (16). The laminate is also slitted or rouletted along and inside the two series of feed perforations (16), (16) over the length of the belt-shaped main body (1) to have separation lines (17) and (18).

The duplicate slips (3), (4), (5), (6) and (7), too, have the same columns printed on the surface thereof and carbon pressure-sensitive layers (19), (20), (21), (22) and (23) provided on the back surface thereof, respectively. The series of feed perforation can be separated from the main body of the pressure-sensitive sticker slip (1) at the separation lines.

The blanks for destination, sender, goods to be shipped, etc. are filled in by the client so that the same data are duplicated on the duplicate slips through the carbon pressure-sensitive layers. The agent hands over the client's duplicate slip to the client, keeps the agent's duplicate slip in custody, and peels the release paper from the sticker slip (1) which is then stuck on the package to be shipped.

Some transport companies employ a delivery slip comprising a client's duplicate slip, an agent's duplicate slip, a pressure-sensitive transfer sticker slip (1), a transport company's duplicate slip, a delivery certificate, and a release paper (10) laminated in this order from the top thereof.

A synthetic paper is writable by a ball-point pen, pencil, etc., water-resistant and difficultly scratchable and therefore is used for sticker slip (1).

The delivery sticker slip as a sticking cover made of the water-resistant synthetic paper has a large number of fine voids therein and a large number of cracks on the surface by stretching a film containing a thermoplastic resin and fine inorganic powders. The synthetic paper has a light weight because of the fine voids therein. Further, since the sticker slip has a large number of cracks on the surface thereof and a roughened surface, it has excellent printing characteristics, typing characteristics and writing characteristics.

The delivery slip is prepared by a process which comprises printing on the surface of a synthetic paper and printing a carbon pressure-sensitive layer on the back surface of the synthetic paper, forming feed perforations on both sides of the synthetic paper, winding the synthetic paper in custody to form a sticker slip roll, releasing the sticker slip roll, a release paper roll, and various rolls of similarly printed and perforated duplicate slip pulp-paper at the same pulling speed while roll-coating an adhesive onto the various slips and release paper at one edge area and an adhesive on the sticker slip at regular intervals, superposing the sticker slip, the release paper, and the various duplicate slips on a sprocket in this order from the top with pins on the sprocket fitting in the feed perforation so that these slips and release paper are integrated into one body by means of the adhesive coated at the left edge area thereof, and then cutting the margin away from the two series of feed perforations at both sides of the integrated group of slips.

However, the foregoing preparation process has the following disadvantage. The synthetic paper forming the sticker slip differs from the pulp paper forming the slip in tensile modulus. (In general, a synthetic paper has a tensile modulus as low as from ¼ to ⅛ of that of pulp paper.) With the conventional slip binding machine which introduces various webs onto the sprocket at the same tensile strength (same speed), the synthetic paper web and the pulp paper web show different spaces between feed perforations after a prolonged operation due to their difference in tensile strength, making it impossible to register the duplicate slips on the sticker slip in printing. As a result, defectives in set binding can occur (percent failure: 0.1–0.3%).

SUMMARY OF THE INVENTION

An object of the present invention is to provide a delivery sticker slip which can be easily registered during the preparation of delivery slip to produce a deliver slip with little failure in set binding.

The present invention provides a pressure-sensitive transfer delivery sticker slip, comprising a monoaxially-stretched multi-layer film having an opacity of not less than 80% (as determined according to JIS P-8138) and a tensile modulus of not less than $2\times10^4$ kgf/cm$^2$ in the stretching direction (JIS K-7127) obtained by monoaxially stretching a laminated film having a surface layer (B) made of a resin composition comprising from 60 to 80% by weight of a finely divided inorganic powder ($B_2$) incorporated in from 20 to 40% by weight of a crystalline polyolefin ($B_1$) laminated on at least one side of a core layer (A) comprising as a base a resin composition comprising from 1 to 30% by weight of a finely divided inorganic powder ($A_2$) incorporated in from 70 to 99% by weight of a crystalline polyolefin ($A_1$) at a temperature of not higher than the melting point of said crystalline polyolefins ($A_1$, $B_1$) by a stretch ratio of from 3 to 10 in such a manner that a large number of fine isolated voids are formed in the various layers of the multi-layer film, the columns of destination, item to be delivered, bar code, etc. being printed on the surface of said surface layer (B) and a carbon or non-carbon pressure-sensitive layer being provided on the back side of said monoaxially-stretched multi-layer film.

DETAILED DESCRIPTION OF THE INVENTION

Monoaxially-stretched Multi-layer Film

Figure 1:
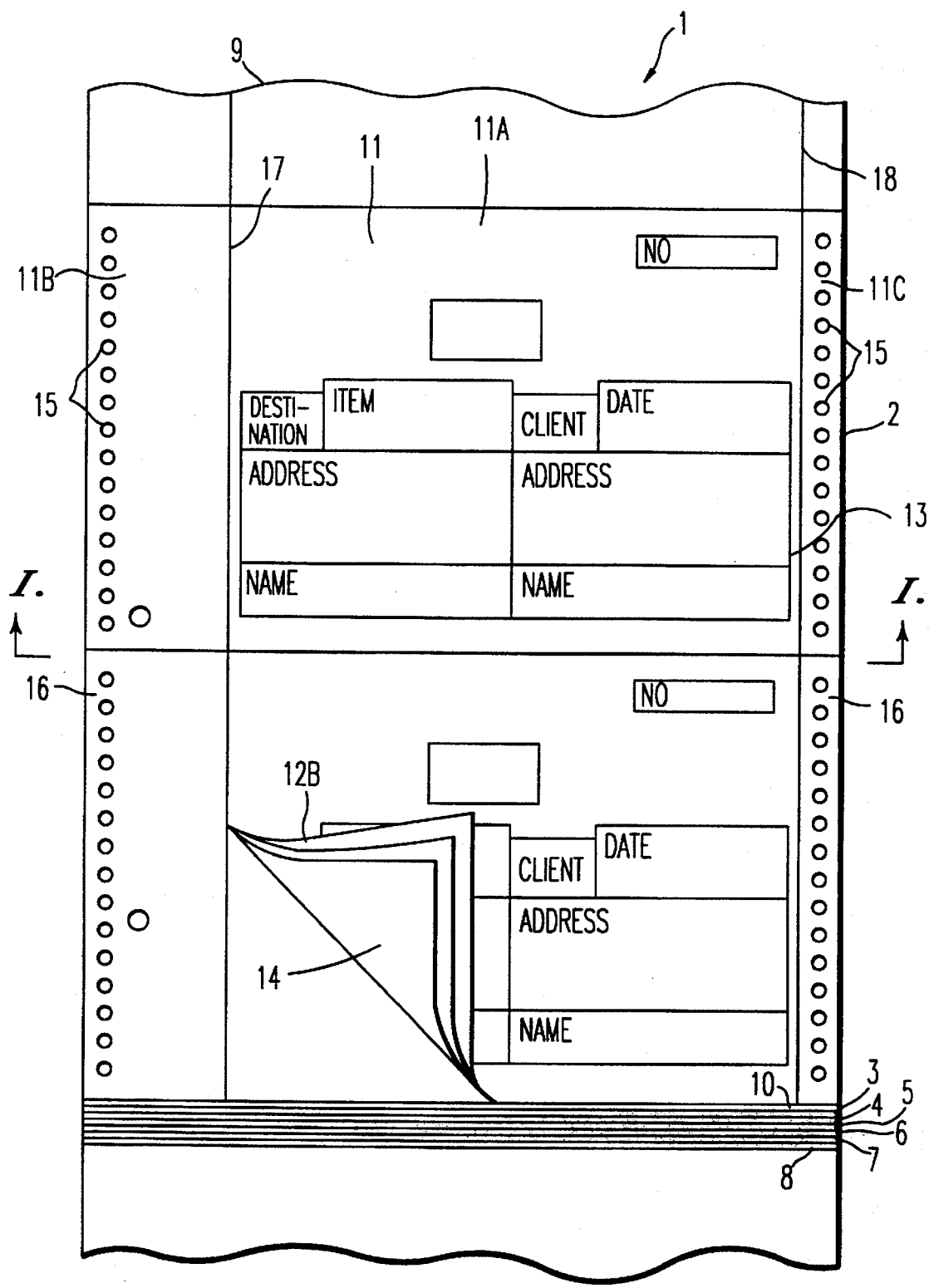
FIG. 1 is a plan view of a continuity of delivery sticker slips as viewed from the cover surface thereof.

The monoaxially-stretched multi-layer film for use in the present invention is a monaxially-stretched laminated film obtained by monoaxially stretching a laminated film having a surface layer (B) made of a resin composition comprising from 60 to 80% by weight of a finely divided inorganic powder ($B_2$) incorporated in from 20 to 40% by weight of a crystalline polyolefin ($B_1$) laminated on at least one side of a core layer (A) comprising as a base a resin composition comprising from 1 to 30% by weight of a finely divided inorganic powder ($A_2$) incorporated in from 70 to 99% by weight of a crystalline polyolefin ($A_1$) at a temperature of not higher than the melting point of said crystalline polyolefins ($A_1$, $B_1$) by a stretch ratio of from 3 to 10 in such a manner that a large number of fine isolated voids are formed in the various layers of the multi-layer film.

(a) Core Layer (A):

As the crystalline polyolefin ($A_1$) to be incorporated in the core layer (A) of the foregoing monoaxially-stretched multi-layer film there may be used one having a crystallinity of from 20 to 75%, preferably from 30 to 70%. Examples of such a crystalline polyolefin include homopolymers of $C_{2-8}$ α-olefin such as ethylene, propylene, butene-1, hexene-1, octene-1, heptene-1, 4-methylpentene-1 and 3-methylpentene-1, and copolymers of two or more of these α-olefins.

Specific examples of such a crystalline polyolefin include high density polyethylene, propylene homopolymer, ethylene-propylene copolymer, propylene-butene-1 copolymer, poly(4-methylpentene-1), propylene-ethylene-butene-1 copolymer, and propylene-3-methylpentene-1 copolymer.

Particularly preferred among these polyolefins are propylene homopolymer and poly(4-methylpentene-1) having a melting point (peak temperature on DSC curve) of from 160° C. to 180° C. and a melt flow rate (as determined at 230° C. under a load of 2.16 kg; JIS K-7210) of from 0.5 to 20 g/10 min.

Examples of the finely divided inorganic powder ($A_2$) include finely divided powder of calcium carbonate, calcined clay, diatomaceous earth, talc, titanium oxide, barium sulfate, aluminum sulfate and silica having an average grain diameter of not more than 10 μm, preferably from 0.1 μm to 4 μm.

If the content of the finely divided inorganic powder falls below 1% by weight, the desired opaque film having an opacity of not less than 80% cannot be obtained. On the contrary, if the content of the finely divided inorganic powder exceeds 30% by weight, too large a number of fine voids are formed due to stretching, causing a remarkable drop in the tensile modulus in the stretching direction. Therefore, the resulting core layer is unsuitable for delivery sticker slip.

(b) Surface Layer (B):

As the finely divided inorganic powder ($B_2$) to be incorporated in the surface layer there may be used the finely divided inorganic powder described with reference to the core layer (A). The finely divided inorganic powder to be incorporated in the surface layer and the core layer may be the same or different.

As the crystalline polyolefin ($B_1$) to be incorporated in the surface layer there may be used the same crystalline polyolefin as incorporated in the core layer (A). A propylene homopolymer, propylene-ethylene random copolymer, and high density polyethylene having a density of from 0.950 to 0.970 g/cm$^3$ are preferred from the standpoint of cost.

If the content of the finely divided inorganic powder in the surface layer (B) falls below 60% by weight, it gives a poor back carbon ink-receptivity.

On the contrary, if the content of the finely divided inorganic powder in the surface layer (B) exceeds 80% by weight, it gives a poor dispersibility of the finely divided inorganic powder in the film matrix, deteriorating the stretchability of the film.

The foregoing monoaxially-stretched multi-layer film can be prepared, e.g., by the following method.

The monoaxially-stretched multi-layer film can be obtained by melt-kneading a resin composition of core layer (A) and a resin composition of surface layer (B) through separate extruders, supplying the two resin compositions thus melt-kneaded into a co-extrusion die where they are melt-laminated, co-extruding the laminate in a sheet form, allowing the sheet to cool to a temperature of from 10° C. to 60° C., and then re-heating the sheet to a temperature of from 5° C. to 50° C. lower than the melting point of the crystalline polyolefin incorporated in the core layer where it is then stretched in the machine direction by a stretch ratio of from 3 to 10 by using the difference in circumferential speed between the rolls.

The monoaxially-stretched multi-layer film is then subjected to annealing, corona discharge treatment, etc. as necessary.

The monoaxially-stretched multi-layer film thus obtained has a large number of fine voids to a percent void of from 10% to 50%, preferably from 20% to 40%, as calculated by the following equation:

$$\% \text{ Void} = \frac{\text{Density of Unstretched Film} - \text{Density of Stretched Film}}{\text{Density of Unstretched Film}} \times 100$$

Referring to the thickness of the monoaxially-stretched multi-layer film, the thickness of the core layer (A) is from 20 μm to 250 μm, preferably from 30 μm to 120 μm. The thickness of the surface layer (B) is from 1 μm to 50 μm, preferably from 2 μm to 30 μm. The total thickness of the monoaxially-stretched multi-layer film is from 30 μm to 300 μm, preferably from 50 μm to 100 μm from the standpoint of cost.

Further, the monoaxially-stretched multi-layer (laminated) film has an opacity (JIS P-8138) of not less than 80%, preferably not less than 85%, and a tensile modulus (JIS P-7127) of not less than $2 \times 10^4$ kgf/cm$^2$, preferably from 22,000 to 50,000 kgf/cm$^2$, in the stretching direction.

Printed Layer

Columns of destination, sender, goods to be shipped, bar code, etc. are printed on the surface layer (B) of the foregoing monoaxially-stretched multi-layer (laminated) film by means of a form printing machine with an offset ink or a gravure ink.

Transfer Pressure-Sensitive Layer

The back carbon ink layer or back non-carbon ink layer is printed on the other surface of the foregoing monoaxially-stretched multi-layer (laminated) film by a form printing machine. The thickness of the ink layer is in the range of from 3 μm to 5 μm.

As the carbon ink there may be used a carbon ink for synthetic paper available from Naigai Carbon Ink Co., Ltd. and Teikoku Ink Seizo K.K.

The non-carbon ink layer may contain a binder and a fine capsule comprising a colorless electron-donating leuco dye dissolved in a capsule oil. On a surface of pulp paper on which the leuco dye is transferred there is provided a coating layer comprising an electron-accepting developer and a binder. (cf. JP-B-8-22610 (the term "JP-B" as used herein means an "examined Japanese patent publication"), JP-B-58-19475, and JP-A-53-31405 (the term "JP-A" as used herein means an "unexamined published Japanese patent application"))

Formation of Feed Perforations

In general, a sprocket hole punching tool mounted on the form printing machine is used. With this punching tool, feed perforations having a diameter of about 4 mm are continuously punched on the monoaxially-stretched multi-layer (laminated) film and the pulp paper as duplicate slips at either or both edges thereof at a rate of 3 holes per 2.54 cm. The web thus perforated is then wound.

Duplicate Slip

As the material of the client's duplicate slip, agent's duplicate slip, delivery certificate, transport company's duplicate slip, etc. there may be used a pulp paper, in particular, high quality paper, having a weight of from 80 to 200 g/m$^2$.

The tensile modulus of this duplicate slip is normally from $4 \times 10^4$ to $6 \times 10^4$ kgf/cm$^2$.

These duplicate slips, too, have columns of destination, sender, goods to be shipped, etc. printed on the surface thereof and a carbon or non-carbon pressure-sensitive layer printed on the other surface thereof. However, the lowermost duplicate slip does not necessarily have the carbon or non-carbon ink pressure-sensitive layer printed on the back surface thereof.

Binding of Slips 4 to 7 rolls of duplicate slips having various columns printed on the surface thereof, a carbon ink or non-carbon ink printed on the back surface thereof, and feed perforations punched at one edge thereof, a roll of a back sticking paper having an adhesive applied to the back surface thereof and a release paper stuck thereon, and a roll of a cover sticker slip are each fed by a collator in a collating machine (binding machine) via the feed perforations punched on the left edge of the various slips in such a manner that they are arranged such that the back sticking paper lies lowermost. These webs are then introduced into the collating machine.

In the collating machine, the cover sticker slip is coated with an adhesive over a width of from 2 mm to 3 mm disposed 5 mm to 6 mm inside and parallel to the left series of feed perforation and is also coated with an adhesive over a width of from 8 mm to 10 mm at the leading edge and the tail end thereof by a coating roll mounted on the collating machine.

On the other hand, the 4 to 7 duplicate slips are each coated with an adhesive over a width of from 2 mm to 3 mm disposed 5 mm to 6 mm inside and parallel to the left series of feed perforations on the back surface thereof by means of the coating roll. Further, these duplicate slips are each rouletted at a position of 8 mm to 10 mm inside the left series of feed perforations so that they can be cut away.

The various slips thus processed are superposed on each other. These slips were slit outside the adhesive area provided on the left edge thereof. The laminate is then cut by a guillotine at the central part of the adhesive area provided on the leading edge and the tail end of the cover sticker slip to obtain a set of delivery slip comprising duplicate slips enclosed in an envelope.

In another embodiment, 4 to 7 rolls of duplicate slips having various columns printed on the surface thereof and a carbon ink printed on the back surface thereof and feed perforations formed on both sides thereof, a roll of a sticker slip having feed perforations formed thereon and a roll of a release paper having feed perforations formed thereon are released and superposed on each other with the feed perforations fitting on the sprocket pin on a collating machine (binding machine). During this procedure, the various duplicate slips are each roll-coated with an adhesive over a width of from 2 mm to 3 mm at a position left to that of the sticker slip. The sticker slip is roll-coated with a pressure-sensitive adhesive over a width of from 3 mm to 5 mm at the leading edge and the tail end thereof and over a width of from 2 mm to 3 mm at the left side thereof and roll-coated with an adhesive at the left edge thereof before being fitted on the sprocket for rewinding.

The laminate thus prepared is then cut to remove the line of feed perforations therefrom to prepare a delivery slip comprising a cover sticker slip and duplicate slips having the same size.

The present invention will be illustrated in more detail with reference to examples below, but these are not to be construed as limiting the invention.

The monoaxially-stretched multi-layer film for use in the present invention and the delivery slip comprising this monoaxially-stretched multi-layer film as a sticker slip will be further described in the following examples and comparative examples.

Evaluation Method

The evaluation of physical properties as used in the following examples and comparative examples were accomplished by the following methods.

Tear Modulus

In accordance with JIS K-7127 (measured at 23° C.)

Opacity

In accordance with JIS P-8138

Density
In accordance with JIS P-8118
Whiteness
In accordance with JIS L-1015
UV Ink Form-Printability Using a UV form printing machine available from Mei Seisakusho K.K., a four-color (black, blue, red, yellow) UV form printing was made on the surface of the monoaxially-stretched multi-layer film (synthetic paper) with a Type BC-161S UV offset printing ink available from T&K Toka K.K. The prints were then evaluated for ink transferability and adhesivity.

(1) Ink Transferability

The dot area on the various color images were each magnified 30 times by a magnifying lens to allow visual judgment of dot reproducibility.

Dot reproducibility:

100–75%: Good (o)
74–50%: Slightly poor (Δ)
49–0%: Poor (x)

(2) Ink Adhesivity

An adhesive tape "Cellotape" available from Nichiban Co., Ltd. was strongly bonded to the printed surface of the synthetic paper. The adhesive tape was then quickly peeled off the synthetic paper along the printed surface thereof. The degree of separation of ink from the surface of the synthetic paper was visually judged.

Ink retention:

100–95%: Good (o)
94–80%: Slightly poor (Δ)
79–0%: Poor (x)

(3) Pencil Writability

Using a 9800"HB" pencil available from Mitsubishi Pencil Co., Ltd., the monoaxially-stretched multi-layer film was examined for writability.

o ... Writable
x ... Nonwritable

Example 1

Preparation of Sticker Slip Comprising Monoaxially-stretched Multi-layer Film (1) A composition obtained by blending 60 parts by weight of a propylene homopolymer having a melt flow rate (as determined at 230° C. under a load of 2.16 kg, hereinafter abbreviated as "MFR") of 0.8 g/10 min., a crystallinity of 67% and a melting point of 167° C., 20 parts by weight of a high density polyethylene having a melting point of 134° C. and 20 parts by weight of calcium carbonate having an average grain diameter of 1.5 μm was melt-kneaded by means of an extruder which had been kept at a temperature of 250° C., and then supplied into a co-extrusion dye as a material of core layer (A).

(2) A composition (B) obtained by blending 35 parts by weight of a propylene homopolymer having MFR of 10 g/10 min., a crystallinity of 64% and a melting point of 167° C., 60 parts by weight of calcium carbonate having an average grain diameter of 1.5 μm and 5 parts by weight of titanium oxide was melt-kneaded at a temperature of 240° C. by means of another extruder which had been kept at 250° C., and then supplied into the co-extrusion die where it was then laminated on the both surfaces of the composition of core layer (A). The laminate was then extruded through the co-extrusion die in a sheet form. The sheet thus extruded was then cooled to a temperature of 60° C. by a cooling roll to obtain a three-layer (B/A/B) unstretched sheet.

Subsequently, the three-layer unstretched sheet was stretched in the machine direction by a stretch ratio of 5 by a longitudinal stretcher made of a group of rolls having different circumferential speeds which had been kept at 135° C., annealed at a temperature of 150° C., cooled to a temperature of 50° C., and then slit at the both edges thereof to obtain a 80-μm (B/A/B=5/70/5 μm) thick monoaxially-stretched three-layer (B/A/B) film having fine isolated voids formed therein.

The monoaxially-stretched three-layer film had a percent void of 30% and an opacity of 88%. The monoaxially-stretched three-layer film also had a tensile modulus of 28,400 kgf/cm$^2$ in the stretching (machine) direction and 9,000 kgf/cm$^2$ in the transverse direction.

Columns of destination, client, goods to be shipped, etc. were then printed on the surface of the monoaxially-stretched three-layer film by a UV offset form printing machine. Carbon Ink (trade name) for synthetic paper available from Teikoku Ink Seizo K.K. was then partially printed on the other surface of the monoaxially-stretched three-layer film to form a carbon pressure-sensitive layer thereon. Feed perforations having a diameter of 4 mm were then punched on the monoaxially-stretched three-layer film at a position of 10 mm inside from the both sides thereof at a rate of 3 holes per 2.54 cm (1 inch). The monoaxially-stretched three-layer film thus perforated was then wound in a roll form.

Duplicate Slip

A high quality paper having a weight of 100 g/m$^2$ and a tensile modulus of 43,600 kgf/cm$^2$ in the machine direction and 42,400 kgf/cm$^2$ in the transverse direction was used. A UV offset form printing was made on the surface of the high quality paper. Carbon was then printed on the other surface of the high quality paper. Feed perforations were then punched on the high quality paper at the both sides thereof. The high quality paper thus perforated was then wound in a roll form.

Six duplicate slips were thus prepared, i.e., client's duplicate slip, agent's duplicate slip, transport company's duplicate slip, intermediate transport company's duplicate slip, receipt, and transport company main office's duplicate slip. No carbon printing was made on the transport company main office's duplicate slip.

Release Paper

Carbon ink containing carbon, latex and inorganic filler was partially printed on the back surface of a 150-μm thick release paper coated with a silicone resin on the surface thereof. Feed perforations were then punched on the release paper at the both sides thereof. The release paper thus perforated was then wound in a roll form.

Preparation of Delivery Slip

Figure 2:
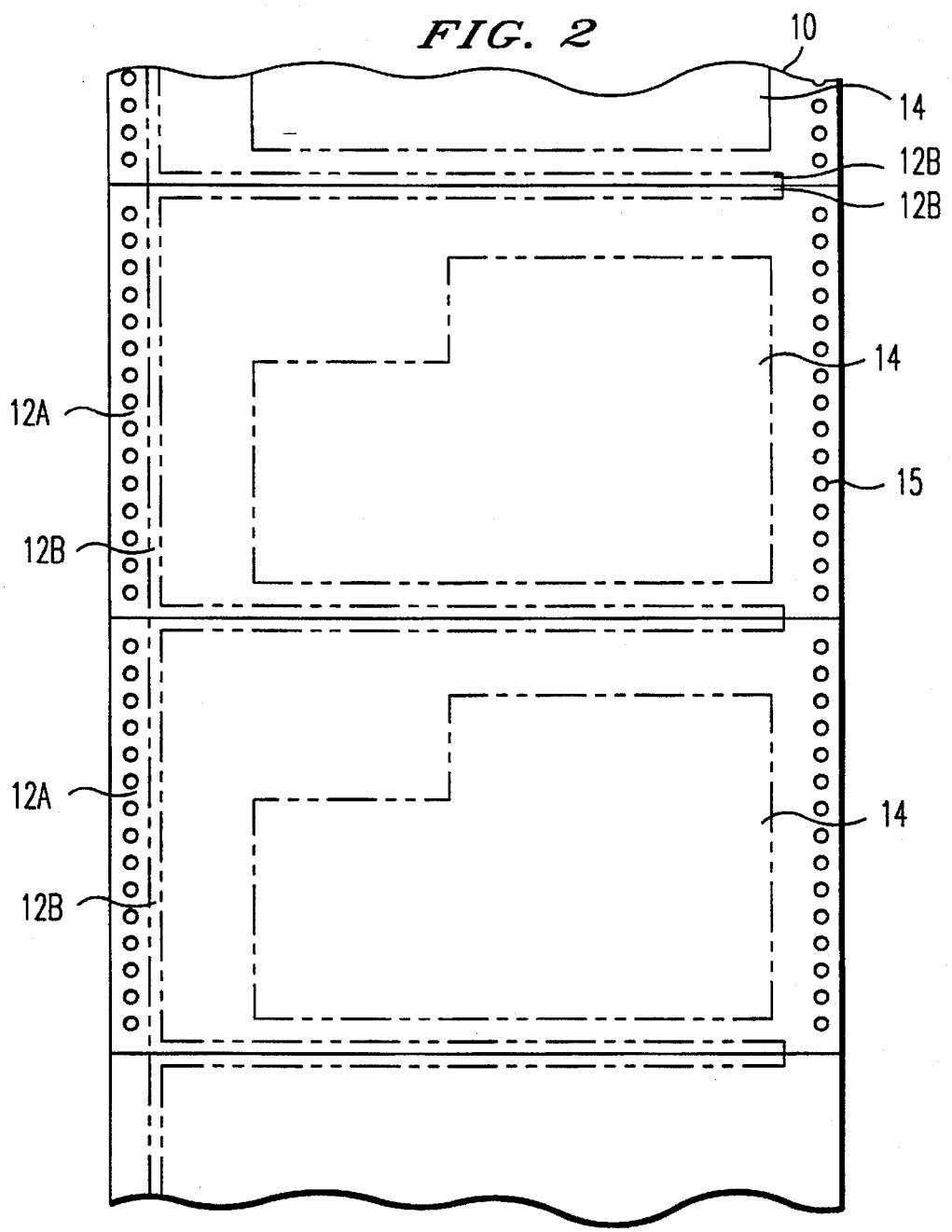
FIG. 2 is a plan view of the back surface of the continuity of sticker slips.
Figure 3:
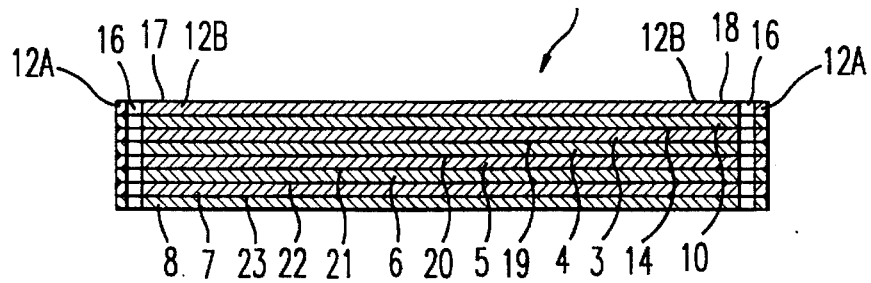
FIG. 3 is a section taken along line I—I of FIG. 1.
Description of Reference Numerals
1 . . . Delivery slip
2 . . . Continuity of sticker slips
3, 4, 5, 6, 7, 8 . . . Continuity of duplicate slips
9 . . . Main body of continuity
10 . . . Belt-shaped release paper
11 . . . Unit printed area
11A . . . Sticking area
11B . . . Blank area
11C . . . Blank area
12A . . . Non-adhesive area
12B . . . Adhesive area
13 . . . Columns to be filled in
14, 19, 20, 21, 22, 23 . . . Carbon pressure-sensitive layer
16 . . . Series of feed perforations
17, 18 . . . Separation line such as slit

The sticker slip for a cover, release paper and duplicate slips were released from the various rolls. These slips were each coated with an adhesive "EH004" available from Nitta Gelatin Co., Ltd. over a width of 3 mm at a position disposed 15 mm inside from the left series of feed perforations on the back surface thereof in an amount of 3 g/m$^2$. The sticker slip was also coated in the transverse direction with a pressure-sensitive adhesive "Oribin" (trade name) available from Toyo Ink Mfg. Co., Ltd. over a width of 10 mm at a machine-directional interval of 115 mm on the back surface thereof. These slips were then introduced onto the pin on the sprocket in a form binding machine in such a manner that the sticker slip, release paper, and various duplicate slips were laminated in this order (sprocket rotary speed: 200 rpm). The two series of feed perforations were then cut away over a width of 12 mm. The laminate was then cut in the transverse direction at a machine-directional interval of 115 mm (center of the 10-mm width of the pressure-sensitive adhesive layer) to obtain 100,000 sets of delivery slips (length: 115 mm; width: 184 mm) shown in FIGS. 1 to 3.

4 out of the 100,000 sets of delivery slips showed misregistration in printing between the sticker slip and the duplicate slips.

COMPARATIVE EXAMPLE 1

The procedure of Example 1 was followed to prepare a delivery slip except that as the material of a sticker slip for a cover there was used the synthetic paper obtained by the following method instead of the monoaxially-stretched three-layer film.

As a result, 187 of 100,000 sets of delivery slips showed misregistration in printing.

Preparation of Synthetic Paper

A composition (B) obtained by blending 80 parts by weight of a polypropylene having MFR of 0.8 g/10 min. and a melting point of 167° C. and 20 parts by weight of calcium carbonate having an average grain diameter of 1.5 µm and a composition (A) obtained by blending 95 parts by weight of a polypropylene having MFR of 0.8 g/10 min. and 5 parts by weight of calcium carbonate having an average grain diameter of 1.5 µm were melt-kneaded at a temperature of 270° C. by separate extruders, and then supplied into a co-extrusion die where they were melt-laminated to form a B/A/B laminate. The laminate was extruded at a temperature of 270° C., and then cooled to a temperature of about 60° C. by a cooling roll.

The laminate was heated to a temperature of 150° C. where it was then stretched in the machine direction by a stretch ratio of 5. The laminate was heated to a temperature of 162° C. where it was then stretched in the transverse direction by a stretch ratio of 7.5 by means of a tenter at that temperature. The laminate was annealed at a temperature of 167° C., cooled to a temperature of 60° C., and then slit at the edges thereof to obtain a 80-µm thick (B/A/B=5 µm/70 µm/5 µm) three-layer biaxially-stretched film of thermoplastic resin having fine voids incorporated therein (A). The biaxially-stretched film had a percent void of 40%. The results of physical properties such as tensile modulus of the biaxially-stretched film are set forth in Table 1.

COMPARATIVE EXAMPLE 2

The procedure of Comparative Example 1 was followed to prepare a delivery slip except that as the synthetic paper there was used Yupo FPG80® (thickness: 80 µm; a laminate having a monoaxially stretched polypropylene surface layer, a biaxially stretched polypropylene core layer and a monoaxially stretched polypropylene back layer) available from Oji-Yuka Synthetic Paper Co., Ltd. The delivery slip thus prepared exhibited physical properties as set forth in Table 1.

238 of 100,000 sets of delivery slips showed misregistration in printing between the sticker slip and the duplicate slips.

Example 2

The procedure of Example 1 was followed to prepare a delivery slip except that the monoaxially-stretched two-layer film obtained by the following preparation method was used instead of the monoaxially-stretched three-layer film.

2 out of 100,000 sets of delivery slips showed misregistration in printing.

Preparation of Monoaxially-stretched Two-layer Film (1) A composition (A) obtained by blending 75 parts by weight of a propylene homopolymer having MFR of 0.8 g/10 min., a crystallinity of 67% and a melting point of 167° C., 5 parts by weight of a high density polyethylene having a melting point of 134° C. and 20 parts by weight of calcium carbonate having an average grain diameter of 1.5 µm was melt-kneaded by means of an extruder which had been kept at a temperature of 250° C., and then supplied into a co-extrusion dye as a material of core layer (A).

(2) A composition (B) obtained by blending 35 parts by weight of a propylene homopolymer having MFR of 10 g/10 min., a crystallinity of 64% and a melting point of 167° C., 60 parts by weight of calcium carbonate having an average grain diameter of 1.5 µm and 5 parts by weight of titanium oxide was melt-kneaded at a temperature of 240° C. by means of another extruder which had been kept at 250° C., and then supplied into the co-extrusion die where it was then laminated on one surface of the composition of core layer (A). The laminate was then extruded through the co-extrusion die in a sheet form. The sheet thus extruded was then cooled to a temperature of 60° C. by a cooling roll to obtain a two-layer (B/A) unstretched sheet.

Subsequently, the two-layer unstretched sheet was stretched in the machine direction by a stretch ratio of 5 by a longitudinal stretcher made of a group of rolls having different circumferential speeds which had been kept at 135° C., annealed at a temperature of 150° C., cooled to a temperature of 50° C., and then slit at the both edges thereof to obtain a 80-µm (B/A=7/73 µm) thick monoaxially-stretched two-layer (B/A) film having fine isolated voids formed therein.

The monoaxially-stretched two-layer film had a percent void of 28% and an opacity of 88%. The monoaxially-stretched two-layer film also had a tensile modulus of 30,400 kgf/cm$^2$ in the stretching (machine) direction and 10,700 kgf/cm$^2$ in the transverse direction.

Example 3

The procedure of Example 2 was followed to prepare a delivery slip except that the monoaxially-stretched two-layer film obtained from the following composition was used.

1 out of 100,000 sets of delivery slips showed misregistration in printing.

Preparation of Monoaxially-stretched Two-layer Film (1) A composition (A) obtained by blending 75 parts by weight of a propylene homopolymer having MFR of 0.8 g/10 min., a crystallinity of 67% and a melting point of 167° C. and 25 parts by weight of talc having an average grain diameter of 1.5 µm was melt-kneaded by means of an extruder which had been kept at a temperature of 250° C., and then supplied into a co-extrusion dye as a material of core layer (A).

(2) A composition (B) obtained by blending 30 parts by weight of a propylene homopolymer having MFR of 10 g/10 min., a crystallinity of 64% and a melting point of 167° C., 65 parts by weight of talc having an average grain diameter of 1.2 µm and 5 parts by weight of titanium oxide was melt-kneaded at a temperature of 240° C. by means of another extruder which had been kept at 250° C., and then supplied into the co-extrusion die where it was then laminated on one surface of the composition of core layer (A). The laminate was then extruded through the co-extrusion die in a sheet form. The sheet thus extruded was then cooled to a temperature of 60° C. by a cooling roll to obtain a two-layer (B/A) unstretched sheet.

Subsequently, the two-layer unstretched sheet was stretched in the machine direction by a stretch ratio of 6 by a longitudinal stretcher made of a group of rolls having different circumferential speeds which had been kept at 135° C., annealed at a temperature of 150° C., cooled to a temperature of 50° C., and then slit at the both edges thereof to obtain a 75-μm (B/A=5/70 μm) thick monoaxially-stretched two-layer (B/A) film having fine isolated voids formed therein.

The monoaxially-stretched two-layer film had a percent void of 26% and an opacity of 85%. The monoaxially-stretched two-layer film also had a tensile modulus of 32,000 kgf/cm$^2$ in the stretching (machine) direction and 11,200 kgf/cm$^2$ in the transverse direction.

TABLE 1

|  | Example 1 | Comparative Example 1 | Comparative Example 2* | Example 2 | Example 3 |
|---|---|---|---|---|---|
| Stretched multi-layer film Number of stretched axes | 1/1/1 | 2/2/2 | 1/2/1 | 1/1 | 1/1 |
| Thickness (surface layer/core layer/surface layer) (μm) | 5/70/5 | 5/70/5 | 20/40/20 | 7/73/— | 5/70/— |
| % Void | 30 | 40 | 33 | 28 | 26 |
| Tensile modulus |  |  |  |  |  |
| Stretching (machine) direction (kg/cm$^2$) | 28,400 | 16,200 | 13,000 | 30,400 | 32,000 |
| Perpendicular to stretching direction (transverse direction) (kg/cm$^2$) | 9,000 | 19,000 | 22,000 | 10,700 | 11,200 |
| Density (g/cm$^3$) | 0.80 | 0.68 | 0.77 | 0.83 | 0.84 |
| % Opacity | 88 | 93 | 90 | 88 | 85 |
| % Whiteness | 95 | 96 | 95 | 95 | 94 |
| UV offset printability |  |  |  |  |  |
| Ink transferability | o | o | o | o | o |
| Ink adhesivity | o | Δ | o | o | o |
| Pencil writability | o | Δ | o | o | o |
| Number of sets out of 100,000 sets of delivery slips showing misregistration in printing | 4 | 187 | 238 | 2 | 1 |

*YUPO FPG80

In the present invention, feed perforations are formed in the stretching direction of the laminated film. Further, the laminated stretched film as a slip material is fed in the stretching direction of the laminated stretched film (direction the tensile modulus of which is higher than the other direction) while being pulled by a sprocket. Thus, the space between the feed perforations shows little dimensional change. Accordingly, it is little likely that the pulp paper and the sticker slip are misregistered in printing.

Further, the laminated film comprises as a surface layer a monoaxially-stretched film comprising a finely divided inorganic powder incorporated therein in an amount of from 60 to 80% by weight and thus exhibits excellent printability and writability.

While the invention has been described in detail and with reference to specific embodiments thereof, it will be apparent to one skilled in the art that various changes and modifications can be made therein without departing from the spirit and scope thereof.

The disclosure of Japanese priority application No. Hei. 7-146919 is hereby incorporated by reference.

What is claimed is:

1. A pressure-sensitive transfer delivery sticker slip comprising (1) a monoaxially-stretched multi-layer film having an opacity of not less than 80% as determined according to JIS P-8138 and a tensile modulus of not less than 2×10$^4$ kgf/cm$^2$ in the stretching direction as determined according to JIS K-7127 obtained by monoaxially stretching a laminated film having a surface layer (B) comprising a resin composition comprising from 60 to 80% by weight of a finely divided inorganic powder (B$_2$) incorporated in from 20 to 40% by weight of a crystalline polyolefin (B$_1$) laminated on at least one side of a core layer (A) comprising as a base a resin composition comprising from 1 to 30% by weight of a finely divided inorganic powder (A$_2$) incorporated in from 70 to 99% by weight of a crystalline polyolefin (A$_1$) at a temperature of not higher than the melting point of said crystalline polyolefins (A$_1$, B$_1$) by a stretch ratio of from 3 to 10 in such a manner that fine isolated voids are formed in the various layers, (2) printing information on the surface of said surface layer (B) and (3) providing a carbon or non-carbon pressure-sensitive layer on the back layer of said monoaxially-stretched multi-layer film.

2. The pressure-sensitive transfer delivery sticker slip according to claim 1, wherein said crystalline polyolefin (A$_1$) has a crystallinity of from 20% to 75%.

3. The pressure-sensitive transfer delivery sticker slip according to claim 1, wherein said crystalline polyolefin (A$_1$) is selected from the group consisting of propylene homopolymer and poly(4-methylpentene-1) and said crystalline polyolefin (B$_1$) is selected from the group consisting of propylene homopolymer, propylene-ethylene random copolymer and high density polyethylene having a density of from 0.950 to 0.970 g/cm$^3$.

4. The pressure-sensitive transfer delivery sticker slip according to claim 1, wherein the void percent is from 10% to 50%.

5. The pressure-sensitive transfer delivery sticker slip according to claim 1, wherein the thickness of said monoaxially-stretched multi-layer film is from 30 μm to 300 μm.

6. The pressure-sensitive transfer delivery sticker slip according to claim 1, wherein the thickness of the core layer is from 20 μm to 250 μm.

7. The pressure-sensitive transfer delivery sticker slip according to claim 1, wherein the thickness of the surface layer is from 1 μm to 50 μm.

8. The pressure-sensitive transfer delivery sticker slip according to claim 1, wherein the opacity is not less than 85%.

9. The pressure-sensitive transfer delivery sticker slip according to claim 1, wherein the tensile modulus is from 22,000 to 50,000 kgf/cm$^2$.

10. The pressure-sensitive transfer delivery sticker slip according to claim 1, wherein said monoaxially-stretched multi-layer film is further laminated to one or more additional laminates, each additional laminate comprising a paper layer containing printing on the surface thereof in registry with the printing on the surface of said surface layer and a carbon or non-carbon pressure-sensitive layer on the back of said paper layer, wherein each pressure-sensitive layer is adjacent to the paper layer containing printing on the surface of the next lower additional laminate, except that the lowermost additional laminate only optionally comprises said pressure-sensitive layer.

* * * * *